United States Patent [19]

Flint

[11] Patent Number: 5,293,616
[45] Date of Patent: Mar. 8, 1994

[54] METHOD AND APPARATUS FOR REPRESENTING AND INTERROGATING AN INDEX IN A DIGITAL MEMORY

[76] Inventor: Orin O. Flint, 26 Haviland St., Worcester, Mass. 01602

[21] Appl. No.: 780,203

[22] Filed: Oct. 22, 1991

[51] Int. Cl.⁵ .............................................. G06F 15/411
[52] U.S. Cl. ........................ 395/600; 364/DIG. 1; 364/283.4; 364/255.2
[58] Field of Search ............................ 395/600; 364/DIG. 1 MS File

[56] References Cited

U.S. PATENT DOCUMENTS

| | | |
|---|---|---|
| 4,290,105 | 9/1981 | Cichelli et al. |
| 4,677,550 | 6/1987 | Ferguson ............................ 395/600 |
| 4,817,036 | 3/1989 | Millett et al. ....................... 395/600 |
| 4,888,698 | 12/1989 | Driessen et al. ................. 395/600 X |
| 5,197,002 | 3/1993 | Spencer ........................... 395/600 X |

Primary Examiner—Thomas M. Heckler
Attorney, Agent, or Firm—Jones, Tullar & Cooper

[57] ABSTRACT

A method apparatus for retrieval of data from an index database is disclosed. Each address in an index memory corresponds to an attribute that may be possessed by one or more records in the index database. Index memory datawords located at each index memory address include a number of binary bits equal to the number of records in the index database. If a record possesses an attribute, the value of the bit at a position corresponding to the record's address in that attribute's index memory dataword will be a binary "1". Priority encoder circuitry is provided to locate the positions of each of the 1's in the index memory datawords so that all of the records in the index database that possess an attribute can be determined. Logic circuitry is provided to combine index memory datawords logically to form new datawords that can be used to identify records that possess either all of a plurality of selected attributes, or one or more of a plurality of selected attributes. This retrieval system employs parallel hardware circuitry to increase data retrieval speed.

9 Claims, 3 Drawing Sheets

METHOD AND APPARATUS FOR REPRESENTING AND INTERROGATING AN INDEX IN A DIGITAL MEMORY

BACKGROUND OF THE INVENTION

The present invention relates, in general, to a method and apparatus for locating and retrieving data from an index in a binary digital memory.

Data indexes are frequently employed in applications where specific data is to be located in, and retrieved from, a memory containing a large quantity of data, such as a database. Searching for specific data in a large database is usually a time consuming procedure, even though it is implemented on a computer.

A common problem in indexing systems is that the data is not identified in an efficient manner. For example, consider automobile part numbers. These numbers are often made up of perhaps a dozen or more digits and letters, and there are therefore trillions of possible part numbers. However, perhaps only fifty thousand of those numbers will be assigned to actual parts. To locate the parts in a warehouse or to locate the part inventory records stored in a file, an index is required to map the small subset of assigned part numbers to a set of location numbers. Clearly, it would be very inefficient and time consuming if the part number searching procedure implemented by the index involved searching all possible part numbers, whether the numbers have actually been assigned to parts or not.

Another example of this problem is a book index which maps words to page numbers. Since there are more than 200 billion ($26^8$) possible combinations of eight letters, but a considerably smaller number of eight letter words, the same situation exists here as with the automobile parts, where a few elements from a large set are mapped onto a second smaller set.

This indexing problem can also be illustrated by the pattern recognition process employed by the human brain. There is an extremely large number of possible patterns of sensory inputs that can be presented to the millions of sensory neurons, but only a relatively small number of those patterns have "meaning" and will be recognized by the brain.

Computers have been utilized to implement data indexes because of their inherent capability of being able to search through a large quantity of data in a relatively short period of time. Sequential searching is the simplest approach, but is usually too slow. Various software techniques, such as hash codes, table look up algorithms, B-trees and other approaches have been developed in an effort to speed up the process.

Hash codes are often utilized to solve the problem discussed above, and are algorithms which transform a large number into a smaller one, usually through use of some type of division algorithm. All of these software techniques still require substantial time for the execution of the algorithms. The present invention seeks to overcome this drawback.

SUMMARY OF THE INVENTION

It is therefore the object of the present invention to provide an improved data locating and retrieval method and apparatus in which data can be located and retrieved much more quickly than has been possible with prior locating and retrieval techniques.

This and other objects of the invention are achieved with a data locating and retrieval method and apparatus which employs a conventional microprocessor having one or more match determination circuits interfaced thereto. The microprocessor matches attributes of an entry, such as a keyword, to address locations in one or more index memories contained in the match determination circuits.

Each of the index memories contains a plurality of multiple bit datawords, each bit of which corresponds to an address in an index database containing collections of records, articles, words, etc. to be identified and retrieved. A parallel bit accumulator is interfaced to each index memory to perform logical AND, OR and NOT operations on the retrieved datawords to form an index database address dataword that is employed to locate matches in the index database.

Encoding and decoding circuitry is interfaced to the output of each accumulator which locates the positions of all binary 1's in the address dataword and uses them as pointers to matching records in the index database, which can then be retrieved.

In the method of the present invention, an entry, such as a keyword, is entered in any conventional manner into the microprocessor which performs the following operations. Each attribute of the entry (e.g., character and its corresponding position in the entry) is employed to select index memory address words either from a first look up table or using hard wired circuitry. Thus, a different index memory address word is selected for each attribute of the entry.

The index memory address words are employed to locate datawords in each of the one or more index memories at each of the corresponding index memory addresses. Each of these datawords contains a binary 1 in any bit position corresponding to an address location in the index database containing a record possessing the attribute associated with that particular index memory address.

Depending on the nature of the data retrieval request, the index memory datawords are logically combined in the one or more parallel bit accumulators to form an index database address word which points to all records in the index database containing "matches" to the entry. In the case of a particular combination of attributes such as would be found in a specific word of text, for example, all of the datawords are logically ANDed together so that only records containing that particular word of text will be returned as a match from the index database.

This indexing method replaces time consuming software algorithm steps with large amounts of hardware circuits which operate in parallel to locate desired index entries quickly. Using state-of-the-art VLSI technology, a very large index (e.g., 1 million records) and associated retrieval circuitry can be contained in a standard, six foot tall circuit board rack.

BRIEF DESCRIPTION OF THE DRAWINGS

The objects, features, and advantages of the present invention will become apparent from a consideration of the following detailed description of preferred embodiments thereof, taken in conjunction with the accompanying drawing, in which.

DETAILED DESCRIPTION OF THE PREFERRED EMBODIMENTS

Turning now to a more detailed consideration of a first preferred embodiment of the present invention, an index database, which contains a collection of records, articles, words, etc, can be utilized to illustrate the method of the present invention. For purposes of this application, the term "record" is employed to define whatever type of information is to be retrieved from the index database. Each record of the database can be characterized by a number of attributes that describe to some degree the contents of the record. Typically, when a database is stored in a machine readable medium (e.g., a magnetic disk), a physical location within the medium, called the physical address, is required to retrieve or read a record. To retrieve a record or group of records from a database by specifying a series of attributes, some process or apparatus must exist to obtain the appropriate physical address or addresses.

Figure 1:
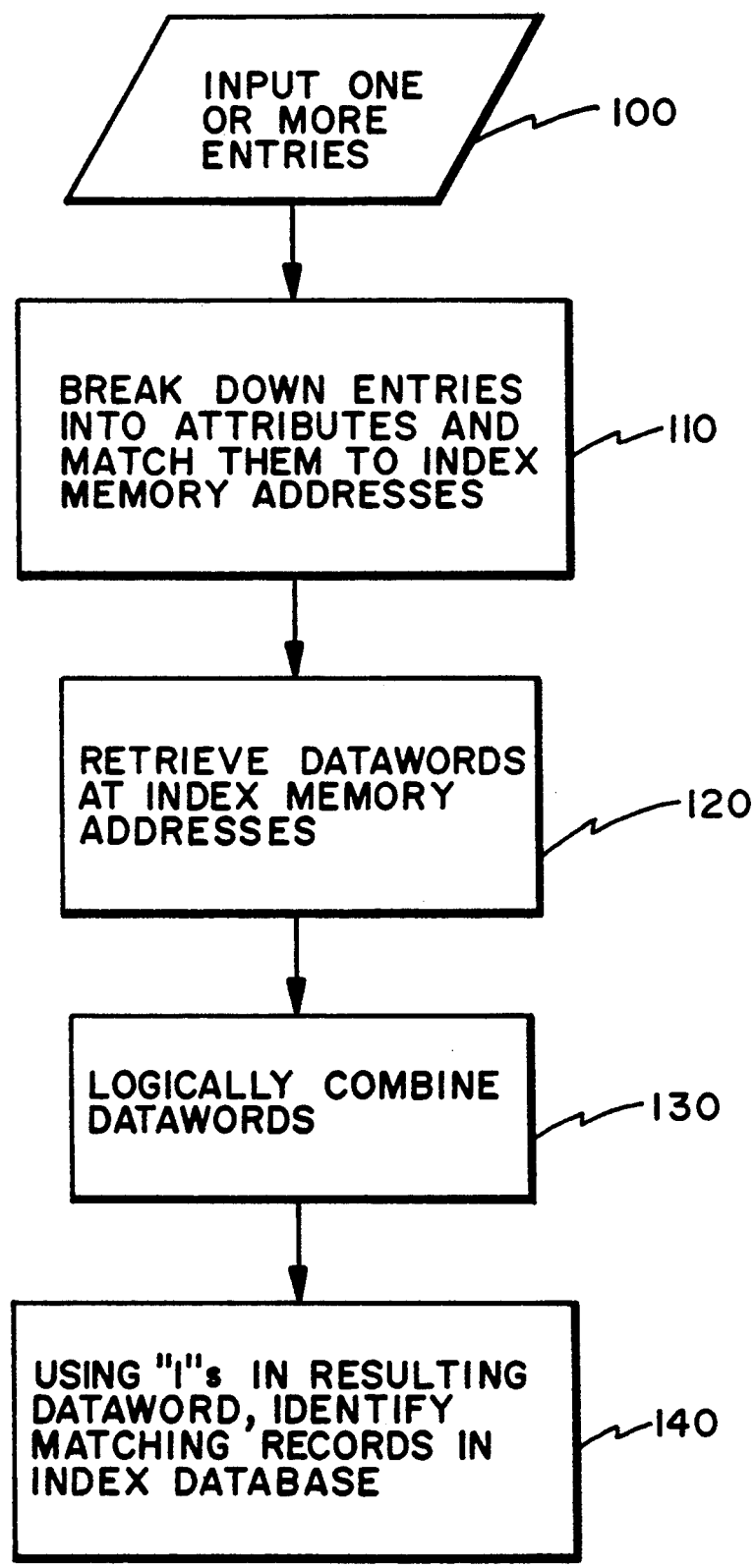
FIG. 1 is a flow chart illustrating the method of the present invention.

The method of the present invention for achieving this is illustrated in the flow chart of FIG. 1. The first step 100 is to input one or more entries, such as keywords, which are to be used for retrieving information stored in an index database. Each of the entries possesses attributes which identify them. For example, a keyword possesses character attributes as well as character position attributes. Next, as illustrated at 110, entries are broken down into their corresponding attributes and each of the attributes is matched to an index memory address either by referencing a look up table in microprocessor memory containing index memory address words for each attribute, or by using hard wired circuitry.

The next step 120 is to retrieve the datawords contained in the index memory at each of the index memory addresses. Each bit of an index memory dataword corresponds to a record in the index database contained in the main memory of a host computer. For example, for a small database containing 32 records, two 16-bit index memories would be required and each of the bits in the index memory datawords will specify which of the records possess a particular attribute. If a record possesses an attribute specified, then the bit position in the index memory dataword which identifies the record will have a binary value of 1. Thus, for example, if the dataword located at an attribute's corresponding address in the index memory has a binary 1 at bit positions 2, 7 and 15, then the records in the index database corresponding to those bit positions possess that attribute.

If more than one attribute is used and it is desired to determine which records possess all of the attributes, or conversely, one or more of the attributes, the next step 130 is to combine the datawords at each of the attribute addresses in the index memory logically. The result is that an index database address dataword is formed which has a binary 1 at each bit position that corresponds to the records which, for example, include all of the attributes, or any of the attributes, depending on the logical operation selected. These records can then be retrieved from the database in step 140 utilizing the addresses specified by the new dataword.

An example of a small index is illustrated in the table below. In this index there are 6 records, 4 characters in each record and 4 characters in the character set. The number of possible attributes is $4^4$ or 256. The number of index memory addresses is $4 \times 4 = 16$, and the number of bits in an index memory dataword is 6 (1 for each entry).

Let the character set characters be A,B,C,D which are encoded A=00, B=01, C=10 and D=11. The four positions in a record are encoded: 1=00, 2=01, 3=10, 4=11.

The character attribute codes and position attribute codes are combined to form four bit addresses, the sixteen index memory addresses will go from 0000 to 1111, corresponding to A - 1, A - 2, A - 3, A - 4, B - 1, etc. to D - 4.

Let the following six records be stored in the index database in the host computer: AADC, ABCD, BDAC, CCCA, DACB, and DDDD. In this example, the index memory will contain the following:

| | ATTRIBUTE | A1 | A2 | A3 | A4 | B1 | B2 | B3 | B4 | C1 | C2 | C3 | C4 | D1 | D2 | D3 | D4 |
|---|---|---|---|---|---|---|---|---|---|---|---|---|---|---|---|---|---|
| | INDEX MEMORY ADDRESS | 0 | 0 | 0 | 0 | 0 | 0 | 0 | 0 | 1 | 1 | 1 | 1 | 1 | 1 | 1 | 1 |
| | | 0 | 0 | 0 | 0 | 1 | 1 | 1 | 1 | 0 | 0 | 0 | 0 | 1 | 1 | 1 | 1 |
| | | 0 | 0 | 1 | 1 | 0 | 0 | 1 | 1 | 0 | 0 | 1 | 1 | 0 | 0 | 1 | 1 |
| | | 0 | 1 | 0 | 1 | 0 | 1 | 0 | 1 | 0 | 1 | 0 | 1 | 0 | 1 | 0 | 1 |
| INDEX DATA-BASE ADDRESS | INDEX DATA-BASE RECORD | | | | | | | INDEX MEMORY DATAWORDS | | | | | | | | |
| 1 | AADC | 1 | 1 | 0 | 0 | 0 | 0 | 0 | 0 | 0 | 0 | 1 | 0 | 0 | 1 | 0 |
| 2 | ABDC | 1 | 0 | 0 | 0 | 0 | 1 | 0 | 0 | 0 | 0 | 1 | 0 | 0 | 1 | 0 |
| 3 | BDAC | 0 | 0 | 1 | 0 | 1 | 0 | 0 | 0 | 0 | 0 | 1 | 0 | 1 | 0 | 0 |
| 4 | CCCA | 0 | 0 | 0 | 1 | 0 | 0 | 0 | 0 | 1 | 1 | 1 | 0 | 0 | 0 | 0 |
| 5 | DABC | 0 | 1 | 0 | 0 | 0 | 0 | 1 | 0 | 0 | 0 | 0 | 1 | 1 | 0 | 0 | 0 |
| 6 | DDDD | 0 | 0 | 0 | 0 | 0 | 0 | 0 | 0 | 0 | 0 | 0 | 0 | 1 | 1 | 1 | 1 |

If the entry ABDC is selected as input for retrieval, the addresses corresponding to the attributes A in the first position, B in the second position, D in the third position and C in the fourth position will be produced. From the table, these are 0000, 0101, 1110 and 1011. The four index memory datawords at these addresses are listed below, along with the result of a logical AND-ing of the four datawords.

| 1 | 1 | 0 | 0 | 0 | 0 | 0000 address |
|---|---|---|---|---|---|---|
| 0 | 1 | 0 | 0 | 0 | 0 | 0101 address |
| 1 | 1 | 0 | 0 | 0 | 1 | 1110 address |
| 1 | 1 | 1 | 0 | 1 | 0 | 1011 address |
| 0 | 1 | 0 | 0 | 0 | 0 | result |

The "1" in the second bit position of the result, which can be termed an index database address dataword, indicates that the input matches the second record in the index database. That is, the second record contains an A in the first position, a B in the second position, a D in the third position and a C in the fourth position.

The above example is simple in nature to provide a clear understanding of the present invention's operation. It will be understood that if the invention is employed to retrieve records, such as articles, using keyword searching techniques, each of the records will contain a large number of possible keywords, and thus will be identified by many different datawords in the index memory, one for each attribute which a record possesses.

Figure 2:
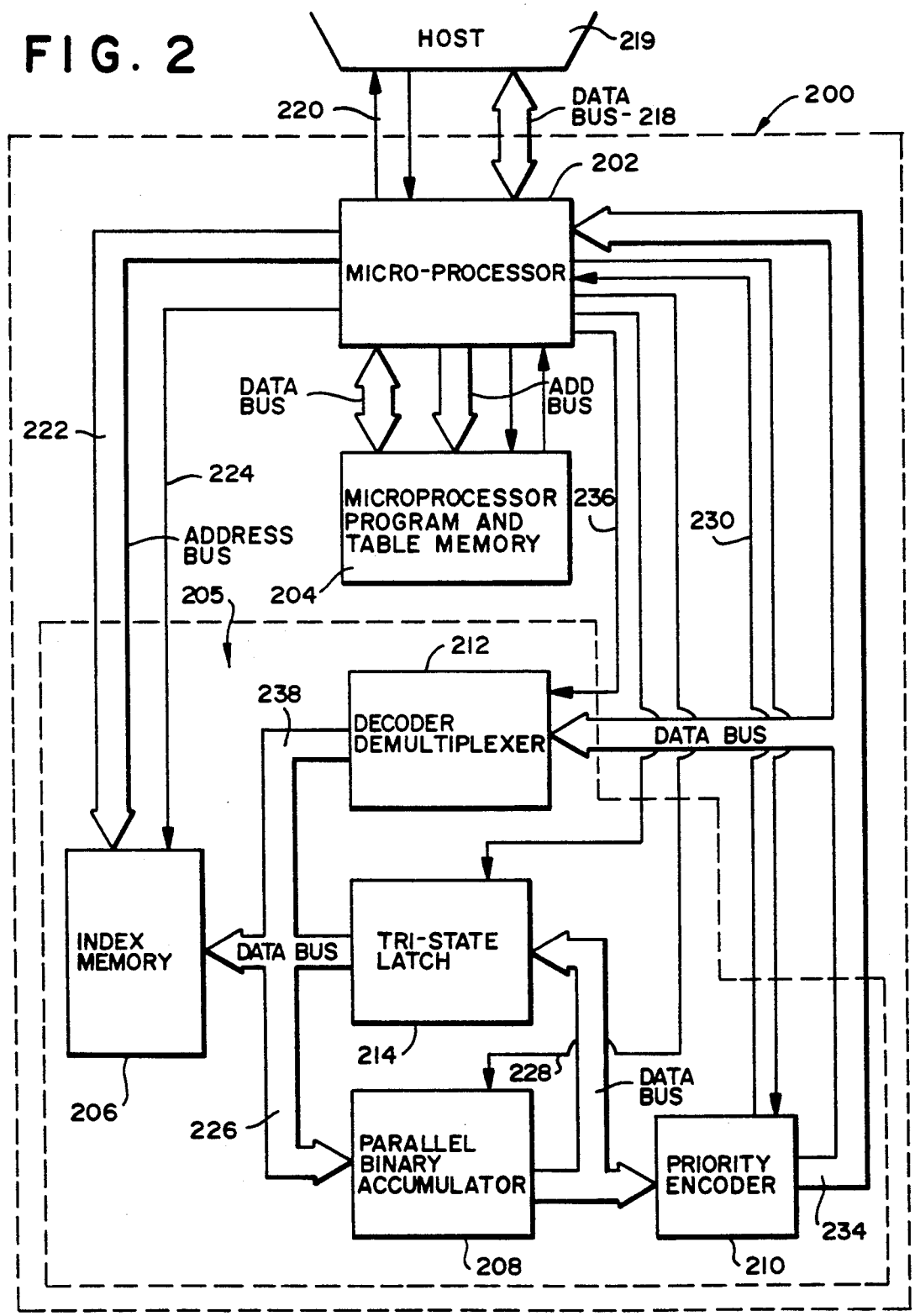
FIG. 2 is a block diagram of a computer circuit for implementing the present invention.

A microprocessor circuit 200 which can be employed to implement the method of the present invention is illustrated in FIG. 2. Specifically, the microprocessor circuit 200 includes a conventional microprocessor 202, a microprocessor program and table memory 204 and a match determination circuit 205. The match determination circuit 205 includes an index memory 206, a parallel binary accumulator 208, a priority encoder 210, a decoder-demultiplexer 212 and a tri-state latch 214.

Microprocessor 202 inputs and outputs data, such as entries, records and keywords, over an I/O databus 218, and receives instructions or commands from a host computer 219 over an instruction bus 220. Microprocessor memory 204 contains data in look up tables which maps inputted attributes to addresses in the index memory 206, and also data which identifies which records of the index database stored in the host computer are to be retrieved based upon the inputted attributes. It should be noted that hard wired circuitry can also be employed to map inputted attributes to addresses in the index memory 206. For example, the address for an attribute can be specified by assigning a character position (e.g. "A" in the first position) code to the higher order bits of the address register and the character code (e.g. "A") in the lower order bits of the address register through hard wired buses.

The index memory 206 in the match determination circuit 205 communicates with the microprocessor 202 via an address bus 222 and a memory read/write select line 224 as is conventional. Index memory 206 contains all of the addresses and the corresponding index memory datawords which are employed to identify those records in the index database which possess the specified attributes, as will be discussed in greater detail below. Each of the bits in the index memory datawords corresponds to a record in the index database.

The index memory datawords are outputted from index memory 206 through a databus 226 to the parallel binary accumulator 208, which serves to combine the datawords logically using any of the Boolean functions AND, OR or NOT. The parallel binary accumulator 208, by way of example, can be one or more Texas Instruments SN74S281 4 bit parallel binary accumulators, and is controlled by microprocessor 202 via an instruction bus 228. As an example, in the case where it is desired to determine which records in the index database possess more than one specified attribute, accumulator 208 performs the logical AND operation of each of the index memory datawords corresponding to those attributes to generate a new dataword that contains binary 1's in the bit positions corresponding to the index database addresses of any such records. It should be noted that in order to carry this function out, the microprocessor 202 must first set all of the bits in the accumulator 208 to "1".

The index database address dataword that is formed by the accumulator 208 is next inputted to priority encoder circuit 210 which serves to identify the bit position of the highest order "1" in the dataword. Priority encoder 210 can be one or more Texas Instruments SN74HC147s, for example. Alternatively, VLSI circuits can be employed for the priority encoder 210. If all of the bits in the dataword are 0, a signal indicating this is sent to the microprocessor 202 via an output line 230. This situation will occur if none of the records of the index database possess the specified attribute combinations.

The output from priority encoder 210 is fed via a databus 234 back to microprocessor 202, and also to decoder/demultiplexer 212, which can be one or more Texas Instrument SN74HC4515s, for example. As with the priority encoder 210, VLSI circuits can also be employed for the encoder/demultiplexer 212. The operation of this circuit is controlled by microprocessor 202 via a select line 236. The output from the decoder/demultiplexer circuit 212 is fed via databus 238 to the input of accumulator 208. The purpose of the decoder/demultiplexer circuit 212 is to remove the highest order 1 from the dataword generated by the accumulator 208 once priority encoder 210 has identified that highest order 1. This circuit acts to generate a dataword that contains all 1's except for the bit position specified by priority encoder 210, which is set to 0. This dataword is then sent via databus 238 to accumulator 208 which logically ANDs this word with the previously generated dataword. The result of this operation is that the highest order 1 is removed from the dataword which is once again sent to the priority encoder 210 so that it will determine the location of the next highest order 1 in the index database address.

This procedure is repeated until the location of all of the 1's in the index database address dataword are determined and fed to microprocessor 202. Also, once all of the 1's have been detected by priority encoder 210, a signal will be sent via line 230 to the microprocessor 202 indicating that the retrieval process is complete. All of the outputs from the priority encoder 210 indicating the bit positions of the 1's in the index database address dataword are fed to microprocessor 202 which utilizes them as addresses for a second look up table contained in the microprocessor memory 204, and provides the identity of all of the records that possess the selected attributes. The identities of these records are then sent by microprocessor 202 to the host computer 219 via I/O bus 218 which will display the identities to a user and/or retrieve the actual records from a separate memory for display.

The tri-state latch 214 has an input connected to the output of the accumulator 208, and an output connected to the index memory 206 and the input of the accumulator 208. The tri-state latch 214 acts as a buffer which holds the output of the accumulator 208 so that it can be written back into the index memory 206. This writing back occurs only when a record is added to, or deleted from, the index database. Specifically, an index memory dataword is read out, modified in the accumulator 208 by adding or deleting a "1" in one or more of the bit locations, and then transferred through the tri-state latch 214 back to the index memory 206. For example, if a new record is to be added to the index database, it is assigned to an empty location in the record identity look up table in the microprocessor memory 204 and the bit corresponding to that location in each of the datawords contained in the index memory which represent attributes possessed by the new record, will be set from "0" to "1".

Figure 3:
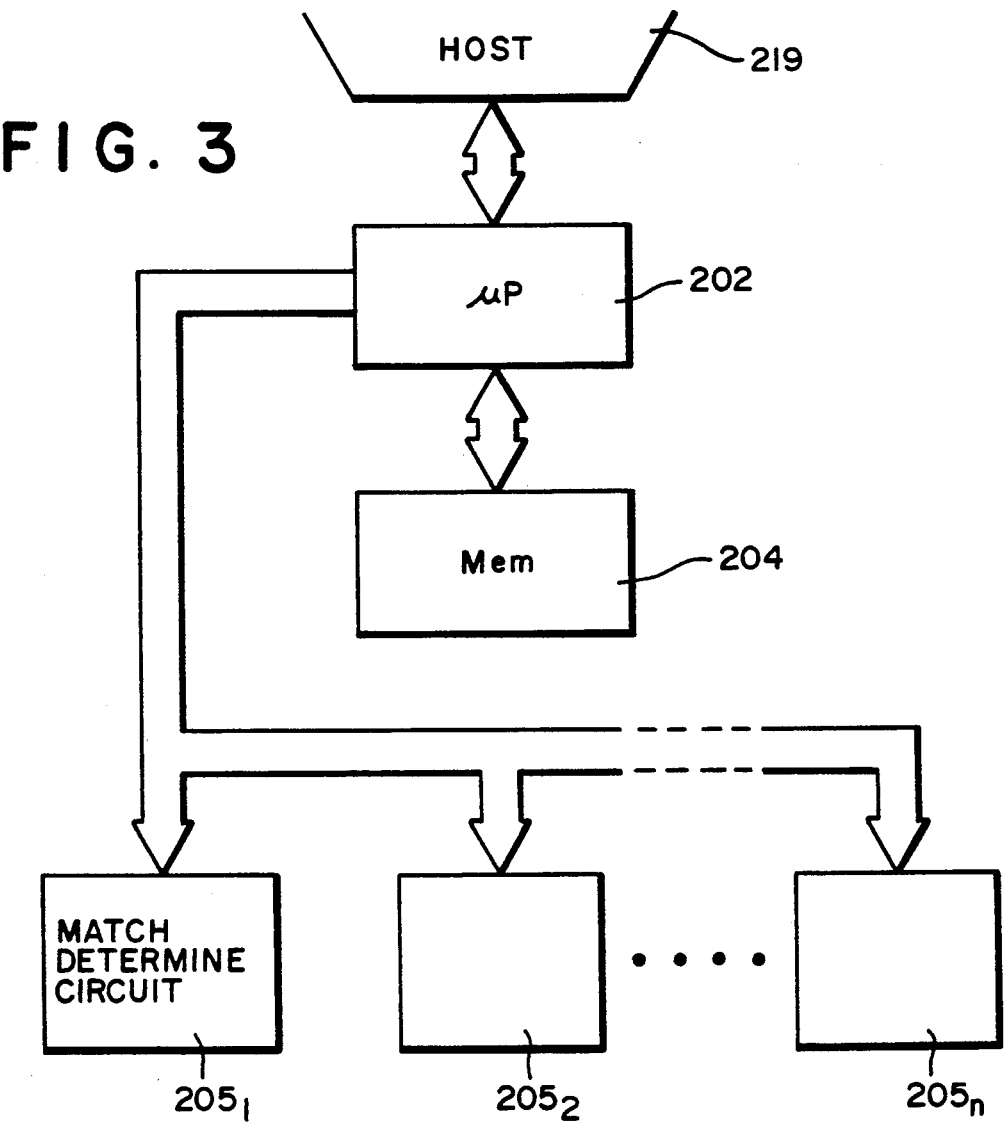
FIG. 3 illustrates an alternative embodiment of the circuit of FIG. 2.

It will be understood that since each bit of the datawords stored in the index memory 206 corresponds to a record in the index database in the host computer 219, a plurality of the match determining circuits 205 connected in parallel will be needed to implement a large index as illustrated in FIG. 3. For example, if the index memory 206 is implemented using memory chips having 16 bit datawords, and the index database contains 16 X n entries, then n match determining circuits 205 will be needed.

Figure 4:
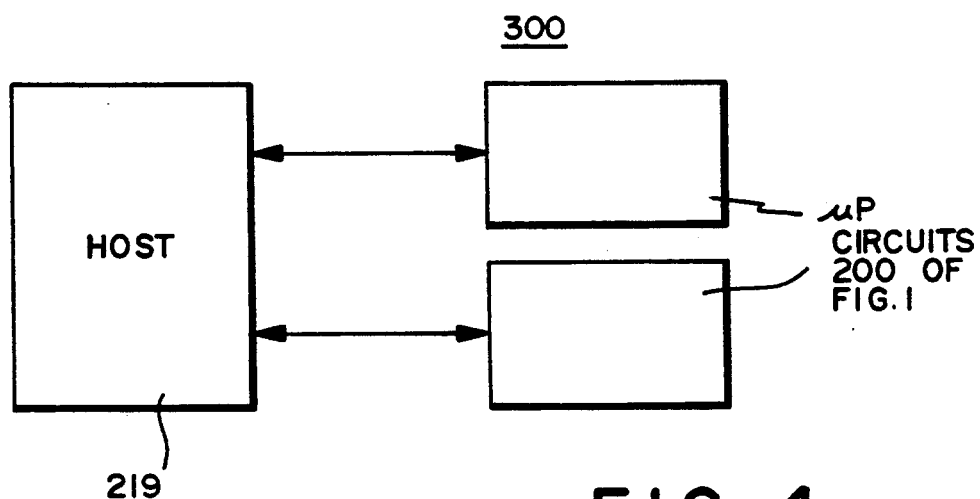
FIG. 4 illustrates a still further alternative embodiment of the present invention.

Multiple indexes can also be cascaded in series with one another as illustrated diagrammatically in FIG. 4 to provide a multiple level retrieval system 300. The multiple level retrieval system can use two or more of the microprocessor circuits 200 of FIG. 2 interfaced to the host computer 219 as shown. For example, a first of the circuits 200 can be used to locate records in the index database containing particular keywords, where the ordering of the characters in each of the key words must be considered. Any matches located during the first level of retrieval can then be used by a second of the microprocessor circuits 200 during a second level of retrieval to identify records in the index containing all of the keywords, regardless of order. Thus, during the first level of retrieval, both the character identification and position attributes are employed to locate records containing particular words. Then during the second level of retrieval, word identification attributes, but not position attributes, are employed to locate records containing a combination of words in any order.

A pseudocode which can form the basis of software to control the operation of the microprocessor circuit 200 is provided below. In this pseudocode, the terms "record identifier", "entry", "pointer" and "element" are used. The definitions of these terms are as follows:

A "record identifier" is a couple containing two parts: an entry and a pointer.

An "entry" is the first part of an index record identifier, and is a pattern, such as an arrangement of letters, pixels or other entities, that can be represented using binary bits.

A "pointer" is the second part of an index record identifier and represents a memory location, disk address, array position or any other number associated with an entry of an index record. During a search and retrieval operation, a presented input entry is compared with record entries throughout the index database. A detected match causes the associated pointer or pointers to be returned as output to the host computer.

An "element" is a piece of an entry. For example, if the entry is a language word spelled out with familiar alphabetic letters, an element would be one or more letters of the word. In general, an element is a subset of the large set that represents an entry.

The following is the pseudocode which generally describes the various operations carried out by the microprocessor circuit 200. These operations include Initialization, Waiting for a Command and Executing a Command. The various commands that can be executed include adding a record, index look up, deleting a record, index backup and index statistics.

A) Initialization

Upon reset, the microprocessor jumps to a known point and starts executing code for initialization. This code initializes ancillary parts of the index circuitry, 0's volatile working memory and establishes tables.

B) Waiting for a Command

The microprocessor loops waiting for interrupt or repeatedly polls an input looking for a change of state. When one of these events occurs, the microprocessor reads in the bus or input port contents and analyzes those contents to determine which host generated command to execute. Handshaking may occur to acknowledge receipt of a command or to request re-transmission if the data is uninterpretable. The commands could be in the form of decimal digits, e.g. "1" could mean "add a record", "2" could mean "look up", etc., and these digits could indicate the number of a pointer in a pointer table where the pointer indicates an entry point to a section of code for executing the specified command.

C) Executing a Command

1) Add a Record

Read "number of record identifier slots available" variable. If 0, return "index full" message and exit, else decrement above variable and continue. Locate an unused record identifier slot (perhaps pop an "unused record identifier slot" stack in memory which contains all unused record slot numbers). Read input entry and input pointer of the record identifier to be added. Store entry and pointer in index table at location determined from above mentioned "unused record identifier slot" number.

Convert input entry into a list of index memory addresses. Send "unused record identifier slot" number, SN to the decoder/demultiplexer (D/D) causing it to produce an output consisting of "0's" in all bit positions except the SN'th bit position. The D/D output is read into the ALU.

Read out from the index memory the first memory word, using the first address in the index memory address list. Logically OR it with the D/D output in the ALU. The ALU now contains the index memory word with its SN'th bit changed from a 0 to a 1. Write the ALU output back to the same address in the index memory.

Repeat this process for each address in the index memory address list.

Signal the host computer that the "add a record" operation is complete. Return to "loop and wait for next command".

2) Index Look Up

Read and store the input entry. Prepare an index memory address list as follows. When the order of the elements of the input entry is unimportant, one may use the distinct binary coding of each element as a memory address. Or, if more convenient, convert the element's code to a new unique number; for example, if the elements are ASCII characters with code values from 32 to 95, subtracting 32 from each would make the address space go from 0 to 63.

If the order of the elements of an input entry is important, then use an approach suggested by the following: assume 16 element positions in an input entry and assign memory addresses using the following formula:

Memory Address = (Element Number X 16) + Position Number

This formula yields a unique address for any element in any position. Alternatively, the formula:

Memory Address = (Position No. X Number of Possible Elements) + Element Number yields a unique address for each element/position combination. Clearly, other operations on position and character number will yield a unique number for each combination of them.

The list of addresses, usually one for each element in the input entry, is referred to here as the index memory address list.

The input entry could be only part of a pattern. For instance, "year 19" is only part of entry "year 1990".

Once the index memory address list is prepared, readout all the index memory datawords addressed by the index memory address list and logically AND them together in the ALU. The result is put on the index memory databus.

The priority encoder, connected to the index memory database, outputs the bit number of the highest order bit position with a 1 in it.

If the "all 0's" line is set meaning the priority encoder finds no 1's, return a "no match" message to the host then exit.

When a match occurs, the output of the priority encoder indicates the bit number which is the slot number (SN) of a match. Readout the pointer stored at the SN'th location of the index record table and return this pointer to the host.

The D/D has the SN as its input and an output of all 0's except for the SN'th bit position which is a "1".

In the ALU, complement this D/D output and logically AND in the previous output which has been stored in the latch, thus resetting the highest order "1".

If there are multiple matches, the output of the priority encoder will now shift to the number of the next highest order "1", and the above procedure is repeated.

Once all "1" bits have been located using the above procedure, the "all 0's" line is set, indicating that all matches have been recorded, then exit.

3) Delete a Record

This operation is the same as "add a record" except, reset the SN'th bit of each index memory dataword addressed by the entries in the index memory address list from 1 to 0 by logically AND'ing them one at a time to the complement of the D/D output and writing them back to the index memory.

Push the SN onto the "unused record identifier slot" stack and increment the "number of unused record identifier slots available" variable by 1.

4) Index Backup

Readout to the host the contents of the index record table. A new index can be reconstructed from this table.

5) Index Statistics

Report to the host the number of available slots and any usage counts or other statistics desired.

Although the invention has been disclosed in terms of preferred embodiments, it will be understood that numerous variations and modifications could be made thereto by those of ordinary skill in the art without departing from the true spirit and scope of the inventive concept as set forth in the following claims.

What is claimed is:

1. A method for locating and retrieving data from an index database comprising the steps of:

storing records to be located and retrieved in an index database;

selecting at least one attribute that may be possessed by one or more records to be retrieved from the index database;

inputting said at least one attribute into a processing means; said processing means including a processor memory and an index memory, said index memory containing a plurality of datawords located at addresses corresponding to said at least one attribute possessed by said one or more records in said index database;

determining the identity of an address in the index memory which corresponds to said at least one selected attribute;

reading a dataword from said index memory which is stored therein at the location corresponding to the address specified by said at least one selected attribute, said dataword including a plurality of binary bits with each said bit corresponding to a record in said index database; and determining from the values of the bits in the dataword, the one or more records in said index database which possess said attributes.

2. The method of claim 1 wherein the step of determining from the value of the bits in the dataword comprises determining the positions of all of the bits in the dataword which are a binary "1", and using said positions to address a look up table in said processor memory which contains the identities of the one or more records in the index database that possess the selected at least one attribute.

3. The method of claim 2, wherein more than one attribute is selected, and the datawords read from the index memory for each of the attributes are logically ANDed to form a new dataword that can be used to determine which records in the index database possess all of the selected attributes.

4. The method of claim 2, wherein more than one attribute is selected, and the datawords read from the attribute memory for each of the attributes are logically ORed to form a new dataword that can be used to determine which records in the index database possess one or more of the selected attributes.

5. A data locating and retrieval system for locating and retrieving data from an index database comprising:
   a) processor means;
   b) an index database interfaced to said processor means containing a plurality of records;
   c) at least a first match determination circuit interfaced to said processor means and including;
      i) an index memory containing a plurality of datawords, each said dataword being specified by an index memory address and including a plurality of binary bits, each of which correspond to an address of a record in said index database; and
      ii) means to determine the binary values of each of the bits of one or more selected datawords of said index memory;
   d) means to input one or more selected attributes to said processor means which are to be matched with records in said index database; and
   e) processor memory means interfaced to said processor means including:
      i) means for mapping each selected attribute to an address in said index memory; and
      ii) means for mapping each bit of the datawords in said index memory at the one or more addresses corresponding to each selected attribute to a corresponding address of each of said records in said index database;

whereby, said processor means can determine the identity of any records in said index database which possess the selected attributes from the values of the bits of each corresponding index memory dataword.

6. The system of claim 5 further including at least a second match determination circuit interfaced to said processor means in parallel with said first match determination circuit.

7. The system of claim 5 wherein said match determination circuit further includes means to combine selected index memory datawords logically to form a new dataword which can be used to determine which records of said index database possess more than one selected attribute.

8. The system of claim 7 wherein said means to combine comprises a parallel binary accumulator interfaced to said index memory.

9. The system of claim 5 wherein said means in said match determination circuit to determine the binary values of each of the bits of one or more selected datawords of said index memory comprises means to determine the bit positions of all binary "1's in each selected dataword.

* * * * *